United States Patent Office 3,210,302
Patented Oct. 5, 1965

3,210,302
EMULSIFIABLE COMPOSITION OF POLYURE-
THANES WITH METAL-SALT DRIERS, ANI-
ONIC EMULSIFIERS, AND PIGMENTS
Stephen T. Bowell and Harry J. Kiefer, Jr., Cleveland,
Ohio, assignors to The Glidden Company, Cleveland,
Ohio, a corporation of Ohio
No Drawing. Filed Dec. 19, 1960, Ser. No. 76,500
18 Claims. (Cl. 260—18)

This invention relates primarily to emulsifiable and/or emulsion primer compositions for exterior use, such as would be used in priming the bare wood of frame houses, and relates secondarily to improved emulsion exterior coating compositions of general use. It relates more particularly to emulsifiable and/or emulsion primers and coatings in which the principal, and preferably sole, protective film-forming material is "isocyanated oil." In the case of primers the entire formulation is designed to co-operate with the "isocyanated oil" film-forming material so as to provide a solvent-type primer which can be used as such, or alternatively can be emulsified to form an emulsion coating which:

(A) Dries rapidly (e.g. in not more than about 4–6 hours) to a homogeneous non-porous, non-water-spotting, protective film, which can be recoated after said drying period and which subsequently cures more fully to retain and improve the above qualities.

(B) When dry, can be top-coated with any exterior emulsion house paint of good quality to provide a duplex coating system having excellent exterior durability.

(C) Has fair durability qualities when dry even when not top-coated, and when top-coated or not provides excellent protection to the wood on which it has been applied as long as it remains there in a non-porous condition; i.e. not badly weathered.

(D) Can be applied to wet wood yet dries promptly to give an adherent, protective priming film;

(E) Can be washed out of brushes, cans, etc. with water or soap solution;

(F) Is easy to apply, and easy to top-coat.

(G) Is satisfactory in adhesion, protective qualities, and durability when used as a primer over weathered painted wood; and (H) Has good can stability enabling it to be marketed in usual channels of trade.

Thus, the primary object of the invention is to provide novel emulsifiable solvent-type primers and/or emulsion primer compositions of the kind described hereinabove and exemplified and explained more fully hereinafter.

A further object is to provide improved emulsion coating compositions for general use.

These and other objects ancillary thereto will be understood more fully by referring to the detailed description which follows.

At the outset, it should be made clear that our term "isocyanated oil" is a term coined for convenience in hereinafter identifying film-forming materials of the type prepared by treating hydroxyl-containing partial fatty acid ester(s) of polyols (e.g. mono- and diglycerides containing acids commonly found in drying, semi-drying and non-drying oils) with polyisocyanates in amounts such that about .50–1.0 isocyanate group is provided for each hydroxyl group in the partial ester(s). The glyceride oils are a common source of the acids contained in the partial esters, but partial esters prepared by reacting like and similar fatty acids or low-molecular-weight-alkanol esters of fatty acids with glycerine and/or with polyhydric alcohols other than glycerine are included as "oils" in our term "isocyanated oil." Also included in the term "isocyanated oils" are reaction products analogous to the foregoing but prepared by treatment of alkyd or like resins containing esterifiable hydroxyl groups with diisocyanates or higher polyisocyanates. The isocyanated oils are discussed more fully hereinafter but have been mentioned and defined here so that the over-all formulation of our primers can now be described briefly.

Our primers are composed of the following main classes of material:

(1) Isocyanated oils functioning as the principal or sole organic film-forming component, and constituting the dispersed phase in an alkaline oil-in-water type emulsion.

(2) A drier component which is preferably oil-soluble and is blended entirely with the isocyanated oil film-forming component, but which can include water-soluble driers located wholly in the aqueous phase.

(3) Anionic emulsifiers supplemented or not with nonionic emulsifiers, said emulsifiers being of specific chemical composition, as explained more fully hereinafter.

(4) Pigment (as an optional but preferred component) of which at least a part is basic pigment (including litharge) and which is dispersed in either or both phases of the oil-in-water type emulsion.

(5) Preservatives, rheology-modifiers, odor chemicals, etc., constituting a miscellaneous and optional component.

(6) Aliphatic and/or aromatic hydrocarbon solvents, and/or water-miscible organic solvents used for dissolving the isocyanated oils to facilitate their emulsification, blending, application, etc. Such solvent component is optional for our emulsion coatings.

It should be understood that the art has proposed or provided emulsion wood primers heretofore. The present invention, however, is primarily concerned with the formulation of our defined isocyanated oil(s) into emulsifiable solvent-type and/or emulsion primers, preferably pigmented, the formulation having been discovered from tests leading to (1) an applied wet emulsion coating which will dry in a reasonably short period of time, and (2) leading to compositions which (whether emulsified or not) will also dry to a homogeneous, substantially non-porous and continuous protective film. Those skilled in the emulsion coating art will recognize that few film-forming materials which are known to yield good primers when applied in the form of solvent-thinned primer coating compositions can be used as the film-formers of emulsions with the expectation of securing dried films having their known primer qualities. Thus, part of the problem solved by the present invention was that of discovering how to formulate an emulsifiable solvent-type primer using isocyanated oil as the principal or sole film-forming material so as to secure from an emulsion film thereof both good primer qualities in the dried films and reasonably fast drying time in the wet films. Allusions to this problem will be pointed out in portions of the subsequent disclosure.

The foregoing components of our emulsion primer and emulsion coatings will now be described in detail under their separate headings.

THE FILM-FORMING COMPONENT

As noted above, our film-forming component is preferably composed entirely of isocyanated oil(s) of the type defined hereinabove. Such isocyanated oils are now old and well-known, and the description thereof contained in U.S. Patent 2,258,475 and in Paint, Oil and Chemical Review, December 17, 1953, pages 28–30, are here incorporated by reference except that in the present invention we do not contemplate the use of isothiocyanates in the preparation of our isocyanated oils. Specifically, our isocyanated oils are preferably prepared from (A) fatty acid esters of polyhydric alcohol(s) with the latter alcohols present in molar excess so as to produce partial esters having an average of 1–2 free (unesterified) hydroxyl groups, and (B) any organic essentially monomeric compound(s) containing an average of two —NCO groups per molecule, with the latter compound(s) proportioned to the partial esters so that there is provided between about .50–1.0 and preferably .75–1.0 —NCO group for each free hydroxyl group.

The partial esters are preferably composed mainly (over 50% by weight) of monoglycerides, but equilibrium super-glycerination mixtures of mono-, di- and tri-glycerides (e.g. those composed of about 40% monoglycerides, 50% diglycerides and 10% triglycerides) can be used. When it is desired that the partial esters be prepared from or contain polyols other than glycerine, then any such polyols (e.g. propylene glycol, trimethylolpropane, pentaerythritol, etc.) can be reacted directly with fatty acids and/or with triglyceride oil(s) or otherwise, to provide the desired free hydroxyl groups. Such and other practices for providing free hydroxyl groups are already well known in the art.

It will be understood that partial esters having an average of two free hydroxyl groups per molecule are preferred (e.g. monoglycerides, monoesters of trimethylolpropane, or di-fatty acid partial esters of pentaerythritol and the like) since such di-hydroxy compounds are capable of forming essentially linear polyurethane molecules when reacted with diisocyanates. For the same reason, diisocyanates are preferred over compounds containing three or more —NCO groups since the latter lead to three dimensional rather than linear molecules or polymers. The partial esters need not, however, consist entirely of di-hydroxy compounds, as noted above, nor do the isocyanates need to contain only two —NCO groups since mixtures of either or both classes of reactants leading mostly to linear structures can be used satisfactorily.

The acids of the partial esters should comprise the fatty acids of drying, semi-drying and non-drying oils and can include rosin or rosin acids, tall oil or tall oil acids, sulfonated oil acids, etc. We prefer linseed, soya, tung or fish oils or other equally unsaturated acids of drying oils because of the faster drying time which they generally confer to our emulsion primers. We especially prefer linseed oil and mixtures of linseed and tung oils wherein the tung is present in amounts below about 50% of the total weight of the mixture. Ricinoleic acid, or esters formed by reacting carboxylic acid(s) with its hydroxyl group, can be used as part of the total acids. The acids of the said partial esters should have an iodine value of at least 90 but where the acids have been secured from heat bodied glyceride oils, then the iodine value should be at least 120.

Typical partial esters can be the following:
(1) Partial glyceride esters prepared by super-glycerinating triglyceride oils substantially to equilibrium,
(2) Distilled monoglycerides,
(3) Distilled mixtures of mono- and di-glycerides, with the monoglycerides predominating.
(4) Equilibrium mixtures obtained by directly esterifying fatty acid(s) with glycerine and/or other polyols such as pentaerythritol, trimethylolpropane, trimethylolethane, dipentaerythritol, polypentaerythritol, propylene glycol, dipropylene glycol, polypropylene glycol, mannitol, sorbitol and other hexitols and/or hexitol anhydrides, etc.
(5) Alcoholysis and/or interesterification mixtures secured by reacting glyceride oils or fatty acid esters of low molecular weight alkanols with appropriate amounts of polyols such as those enumerated in 4.
(6) Mixtures of the above.
(7) Derivatives of the above and mixtures of such derivatives, resulting from treatment of unsaturated fatty acids of the polyol esters thereof with adduct-formers, such as maleic anhydride, cyclopentadiene, dicyclopentadiene, styrene, vinyl toluene, methyl methacrylate, rosin, etc.
(8) Modified products of the above types (1–7), and their mixtures, wherein the modification results from the use of acids or esters obtained from or identical with those of heat-bodied glyceride oils, heat-bodied pentaerythritol esters of fatty acids, heat-bodied adduct-modified oils, etc.
(9) Heat-bodied derivatives of materials of types 1–7 inclusive.
(10) Alkyd resins and/or oil-modified alkyd resins having esterifiable hydroxyl groups, the oil-modified alkyds preferably having been made with materials in classes 1–7 above and with phthalic and/or isophthalic acids or anhydrides.

The isocyanated oils, if not prepared from acids identical with those of bodied oils or if not prepared from bodied oils, can be bodied subsequent to reaction with the polyisocyanates.

Heat-bodied oils, acids of or identical with those of heat-bodied oils, heat-bodied-oil-adducts and/or heat-bodied isocyanated oils are intended herein to mean products the acids and/or adducts of which have been exposed to heat and/or heat plus known bodying catalyst(s) while in the form of polyhydric alcohol esters until there has been secured a substantial increase in the viscosity of the mass of esters. Heat bodying can be effected while the esters are exposed to air or while protected from exposure to air as in vacuum or in a protective inert atmosphere. When heat-bodied drying and/or semi drying oils are used to prepare our isocyanated oils, we prefer the latter to have Gardner Holdt viscosities of Y to $Z_6$ or higher.

In preparing our isocyanated oils, any organic polyisocyanate(s) having an average of about 2 —NCO groups per molecule can be employed, including the aliphatic, alicyclic, and/or aromatic polyisocyanates, e.g. tolyl diisocyanates, methylene bis 4 phenylisocyanate, hexamethylene diisocyanate, bitolylene diisocyanate (3,3'-dimethyl-4,4'-biphenylene diisocyanate), dianisidine diisocyanate (3,3' - dimethoxy - 4,4' - biphenylene diisocyanate), 1,6 hexane diisocyanate, dicyclohexyl methane 4,4' diisocyanate, 1-chlorophenylene 2,4 diisocyanate, and triphenyl p-triisocyanate. These are all commercial products of moderately high purity, but their recitation does not exclude other isocyanates. Mixtures of such compounds can be used.

It will be understood that the fatty acid partial esters which are to be reacted with polyisocyanates should be substantially dry so as to avoid the loss and waste resulting from contact of the isocyanates with water. After the isocyanated oils have been prepared so as to react all of the isocyanate groups, they can be exposed to water without harmful effects. It is because of this aspect among others that the isocyanated oils can be mixed with and dispersed in water to prepare emulsion primers having good can stability.

Aliphatic and/or aromatic solvents, including water-miscible solvents, can be used to dissolve the isocyanated oils after their preparation in the absence of solvents, or can be present during preparation of the said isocyanated oils, particularly where the finished product would otherwise be so viscous as to be difficult to handle in subsequent operations, and/or in applications as an emulsifiable solvent-type coating composition.

THE DRIER COMPONENT

The isocyanated oil(s) used as film-forming material of our primers are slow drying when emulsified unless polyvalent metal salt-type driers are included. Polyvalent metals such as lead, manganese and calcium are preferred when employed in the form of salts of hydrocarbyl acids such as fatty acids and/or aromatic acids, e.g. lead, manganese and/or calcium linoleates, oleates, naphthenates, etc. Only small amounts of driers are needed and amounts between about 0.5% and 2.0% by weight (based on the film-forming solids) have been found to be satisfactory. We prefer to dissolve the driers in the isocyanated oil(s) or their organic solvent solutions, prior to emulsifying the latter. However, driers can be added to the finished emulsion, if desired, to supplement the driers incorporated previously. In such case, the added driers are apt to be located in the aqueous phase and can be water soluble (e.g. acetates of lead and/or manganese) or emulsifiable carboxylates (e.g. naphthenates of lead and/or manganese). It should be understood that driers which are dissolved in the isocyanated oils are not counted as being part of the film-forming components.

EMULSIFIERS

The emulsifiers need to be chosen in respect to two functions, namely, (1) to permit a fine-particle-size (e.g. 0.5 micron or smaller) oil-in-water type emulsion to be formed initially and to be retained indefinitely thereafter, and (2) to accomplish (1) without unduly prolonging the drying time of an applied priming or coating film. Anionic and/or non-ionic emulsifiers of appropriate lipophylic/hydrophylic balance meet function (1) but few have been found which do not impede drying of an emulsion primer, thereby prolonging the drying time. The cationics are ruled out because they react with and can destroy the driers, thereby to prolong the drying time of the emulsion. Nonionics alone such as the alkylene oxide alkanols (e.g. Tween 20, Tween 40, Tween 41, Tween 60 and Tween 80), also prolong drying time, but we have found that small amounts of certain nonionics can be used along with certain anionics to supplement the latter. In the anionics, we have found that the hydrocarbyl sulfates and sulfonates are least harmful to the drying time of the emulsion and hence represent our preferred types of emulsifiers. We have found that both the water-soluble and oil-soluble types of both classes can be used together advantageously and that such combinations are more generally desirable from all functional standpoints than is either type alone. Such blends or combinations of types and classes can involve numerous specifically different emulsifiers. Those of value in the present compositions can be characterized for identification purposes by "HLB values" as determined by Wm. C. Griffin, Jour. Soc. Cosmetic Chemists, vol. I, No. 5, December, 1949; also ibid vol. V, No. 4, December 1954; also The American Perfumer, May 1955, pgs. 26–29, "Calculation of HLB values of Non-Ionic Surfactants." We have found that anionic emulsifiers of the types identified above (and/or the blends of such emulsifiers) having an HLB value between about 11 and 15 give useful results. We especially prefer to use the blends of alkyl aryl sulfonates and alkyl sulfates having HLB values in the above range. Atlas G–3300 and Witco 918 are commercial alkyl aryl sulfonate products of HLB value 11.7 [1]; specifically both of these products are isopropyl amine dodecyl benzene sulfonate. They can be used alone or in blends with for example sodium lauryl sulfate in proportions such that the blend has an HLB value between 11.7 and 15.

Other commercial emulsifiers having HLB values within the aforementioned range are:

Aerosol TR (American Cyanamid), which is sodium bis tridecylsulfosuccinate.

[1] See American Perfumer, supra pg. 28, where it is so listed.

Nekal WS–99 (General Dyestuffs), which is an oil soluble sulfonate;

Alipal MC–470 (General Dyestuffs), which is an alkyl phosphate ester.

These materials are all oil-soluble and useful in the present inventions in effective amounts between about 5% and 18% by weight based on the solids of the film-forming component.

The water content of the finished emulsions prepared directly or prepared indirectly from the emulsifiable solvent-type compositions can vary widely, e.g. from about 12.5% to about 50%. We prefer a water content between about 25% and 40%.

Following is a typical formulation for an oil-in-water type emulsion primer for exterior surfaces, especially unpainted wood, made from a suitably pigmented isocyanate-treated modified oil.

Charge:

| | Pounds |
|---|---|
| Lithrage | 150 |
| Basic carbonate white lead | 2250 |
| Mica | 1250 |
| Titanium dioxide | 450 |
| Isocyanate-treated modified oil (above) | 1650 |
| Mineral spirits | 600 |
| Lead naphthenate drier (24% lead) | 60 |
| Manganese naphthenate drier (6% Mn) | 30 |
| Calcium naphthenate drier (4% Ca) | 30 |
| Fungicide (phenyl mercuric dodecenyl succinate | 30 |

Roller mill above materials one pass.

| | |
|---|---|
| Isopropyl amine dodecyl benzene sulfonate | 340 |
| Water | 4150 |
| 2% solution of methyl cellulose in water | 102 |
| Lead acetate | 40 |
| Sodium lauryl sulphate | 85 |

[1] Dissolve together, then stir into above milled mixture.

The following bulking values [1] apply to the pigments mentioned in the above and other examples:

| | |
|---|---|
| $TiO_2$ | 3.94 |
| Basic carbonate white lead | 6.73 |
| Litharge | 9.5 |
| Talc | 2.77 |
| Mica gal./100 lbs | 4.24 |
| Calcined clay gal./100 lbs | 4.66 |

[1] See "Institute of Paint and Varnish Technology, Physical and Chemical Examination, Paints-Varnishes-Lacquer-Colors" eleventh edition, 1950, pg. 397–404.

A typical emulsifiable formulation is as follows:

| | Lbs. |
|---|---|
| $TiO_2$ | 9.83 |
| White lead | 9.83 |
| Mico (Mineralite 3X) [1] | 20.07 |
| Asbestine 3X | 7.98 |
| Powdered Litharge | 1.98 |
| Isocyanated oil, above | 23.29 |
| Solvent (Amsco 140 Solvent [2]) | 11.20 |
| Thickener (Bentone 38) | .28 |
| Methanol | .10 |

[1] A bulking value of 4.43 gals. per 100 lbs.
[2] An essentially hydrocarbon solvent having a Kauri butanol value of 37–38, a specific gravity (160°/60° F.) of 0.7914, an initial boiling point of about 364° F., a 70%-over point of about 379° F. and a 95%-over point of about 394° F. ASTM end point is 403° F.
[3] Grind together in pebble mill.

To ground mass, add

| | Lbs. |
|---|---|
| G–3300 alkyl aryl sulfonate | 3.69 |
| Amsco solvent, above | 9.85 |
| Lead naphthenate (24% Pb) | 0.70 |
| Manganese naphthenate (6% Mn) | 0.36 |
| Calcium naphthenate (4% Ca) | 0.36 |
| Drier-Antiskin Agent (Super-Ad-It) | 0.20 |
| Methyl Ethyl Ketoxime | 0.28 |
| | 100.00 |

Such a solvent-thinned emulsifiable primer has a non-volatile content of about 77% and weighs about 11.8 lbs. per gallon. It can be thinned for application, if desired, with said Amsco or equivalent solvents. It air-dries in about 6 hours and can be recoated in about 24 hours. It has a flat sheen.

PIGMENTATION

The isocyanated oils alone tend to skin over when drying instead of drying through their entire thickness. Because of this tendency, the pigmentation of our emulsifiable and/or emulsion primers should ordinarily be restricted to a total amount representing between about 20% and 50% of pigment by volume, based on the sum of the pigment volume and the volume of the vehicle. With a pigment volume concentration (P.V.C.) below about 30%, some of the films do not dry all the way through, and with a P.V.C. more than about 50% of the films become unduly porous and hence offer inferior protective qualities. We have found that even a P.V.C. of 42% can be an excessive amount in connection with certain isocyanated oils. Accordingly, we prefer to use a P.V.C. of between about 30% and 42%.

For fast drying, litharge is an essential ingredient in the pigmentation of our emulsion primers. We have found that to promote fast drying the litharge must amount to at least 1.6% by weight of the whole emulsion primer composition. It can be the sole pigment, and in such case the foregoing P.V.C. requirements should be met. Where slow drying of an emulsion primer can be tolerated or where the emulsifiable primer is used without being emulsified, then litharge can be omitted.

White lead, e.g. basic lead carbonate, is a desirable pigment in our emulsifiable and/or emulsion coatings and when used should constitute about 8–21% by volume, based on the total pigment volume.

The lead pigment(s) can be supplemented with a variety of optional hiding pigments, extending pigments and/or conventional fillers. Thus titanium dioxide pigment can be used for hiding and whiteness. Colored hiding pigment(s) such as cadmium colors, iron oxide pigments, chrome colors, etc. can also be used. If extenders and/or fillers are desired then so-called pigmentary materials such as talc, clay, mica, asbestine, and the like can be used in amounts up to about 50% of the total pigment, by weight.

The following examples illustrate the principles of our invention, and include the best modes presently known to us for practicing those principles.

Example 1

THE FILM-FORMING MATERIAL

Isocyanated oil appropriate for use in our typical emulsifiable and/or emulsion primers was prepared from the following materials:

| | |
|---|---|
| Linseed Oil | 82.1% by wt. |
| Pentaerythritol | 5.3% by wt. |
| Litharge (catalyst) | .02% (by wt. on the linseed). |
| Tolyl diisocyanate [1] | 12.6% by wt. |

[1] Hylene TM; a mixture of isomers composed of 80% tolyl 2,4 diisocayanate and 20% tolyl 2,6 diisocyanate. Equally suitable, however, is another commercially-available mixture composed of 65% tolyl 2,4 diisocyanate balance tolyl 2,6 diisocyanate.

The linseed oil was added to a nitrogen-blanketed kettle and was agitated while being heated to 300° F. Then the pentaerythritol and litharge were added, and the heat was raised to 470° F. This heat was held for one-half hour and then the batch was cooled to 160°–180° F. The diisocyanate was then added slowly over a period of one hour and the batch was held for viscosity of $Z_3$ to $Z_4$ (Gardner-Holdt, 25° C.). The batch was then cooled and was ready for use.

Examples 2–6

| (A) Milling Materials | Ex. 2 | Ex. 3 | Ex. 4 | Ex. 5 | Ex. 6 |
|---|---|---|---|---|---|
| Litharge | 160 | 160 | 160 | 160 | 160 |
| Basic carbonate white lead | 2,400 | 2,400 | 2,400 | 800 | 2,400 |
| Mica | 800 | 800 | 800 | 1,600 | 800 |
| Titanium dioxide | 480 | 480 | 480 | 800 | 480 |
| Talc | 640 | 640 | 640 | 630 | ------ |
| Calcined Clay | ------ | ------ | ------ | ------ | 1,080 |
| Isocyanated oil of Ex. 1 | 1,665 | 1,665 | 2,290 | 1,865 | ------ |
| Isocyanated oil, below [a] | ------ | ------ | ------ | ------ | 1,665 |
| Mineral spirits | 720 | 720 | 585 | 200 | 560 |
| Isopropyl amine dodecyl benzene sulfonate | 465 | 372 | 425 | 300 | 243 |
| Lead naphthenate drier [b] | 48 | 48 | 64 | 50 | 48 |
| Manganese naphthenate [b] | 24 | 24 | 32 | 30 | 48 |
| Calcium naphthenate [b] | 24 | 24 | 32 | 30 | 48 |
| Fungicide | 24 | 24 | 32 | 8 | ------ |
| Mill all of the above together. | | | | | |

Mix the following together, then add to milled mixture with stirring:

| (B) Emulsion Primers | Ex. 2 | Ex. 3 | Ex. 4 | Ex. 5 | Ex. 6 |
|---|---|---|---|---|---|
| Sodium lauryl sulfate | ------ | 93 | 75 | 70 | 48 |
| Lead acetate | 46 | 46 | ------ | 45 | 48 |
| Manganese acetate | 9 | 9 | ------ | ------ | 24 |
| Advacar lead catalyst [c] | ------ | ------ | 100 | ------ | ------ |
| Advacar manganese catalyst [c] | ------ | ------ | 50 | ------ | ------ |
| Water | 4,650 | 4,650 | 5,000 | 2,700 | 7,300 |
| Ethylene glycol monobutyl ether | ------ | ------ | ------ | 85 | ------ |
| Pine oil | ------ | ------ | ------ | 85 | ------ |
| Methyl cellulose | ------ | ------ | 20 | ------ | ------ |

[a] Isocyanated oil prepared (in the manner described in Ex. 1) from:

| | Percent wt. |
|---|---|
| Linseed acids | 53 |
| Tung acids | 20 |
| 1,4 butanediol | 9 |
| Glycerine | 6 |
| Toluene diisocyanate (80/20 mixture of isomers) | 12 |

[b] As identified in typical formulas.

[c] The Advacar can be replaced with the following emulsion driers:

| | Parts |
|---|---|
| Manganese octoate (6% Mn) | 20 |
| Igepal CTA 639* | 1 |
| Water | 19 |

Use 75 parts of this to replace the 50 parts of Advacar Mn catalyst.

| | Parts |
|---|---|
| Lead naphthenate (24% lead) | 20 |
| Igepal CTA 639* | 1 |
| Water | 19 |

*Nonionic emulsifier of the formula $R_1OR_2(OR_2)_xOH$ where $R_1$ is lipophylic aliphatic chain and $R_2$ is the short hydrocarbon chain of $C_2H_4$ and $x$ is 7.5.

Use 150 parts of this to replace the 100 parts of Advacar lead catalyst.

Example 7

[An example of tall oil acid/maleic adduct]

| | |
|---|---|
| Tall oil acid (2.1% rosin) | 2320 |
| Maleic anhydride | 73.5 |
| Pentaerythritol | 482 |
| Xylene (reflux solvent) | 100 |

Charge the tall oil and maleic anhydride, heat to 450° F. and hold for ½ hour to form adduct; cool and add the pentaerythritol and xylene. Bring to reflux temperature and hold until an acid number of 5 has been secured.

To prepare film-forming material from above product, charge:

| | G. |
|---|---|
| Reaction product above | 515 |
| Tolyl diisocyanate (65/35 mixture of isomers) | 37.2 |
| Mineral spirits | 340 |

Heat to 170° F. and hold for viscosity of G–H (Gardner-Holdt 25° C.); cool.

| | |
|---|---|
| Color | 3–4L |
| Viscosity | G–H |
| Acid number (on solids) | 4.4 |
| Non-volatile | 60% |

The resulting film-forming product can be used to replace the isocyanated oil of Example 1 in the typical emulsion formulation. The resulting primer dries somewhat more slowly, however, than does that of Example 1. The same film-forming product can be used equally well in the typical emulsifiable primer formulation where a solvent-type of primer is desired.

*Example 8*

(A) PREPARATION OF SORBITOL-MODIFIED LINSEED OIL

| | G. |
|---|---|
| Linseed oil (3 mols.) | 2637 |
| Sorbitol/mannitol mixture (70/30 by wt.) (3 mols) | 603 |
| Mineral spirits | 100 |
| Calcium oxide | 1 |

The above ingredients were charged and heated to 450° F. This temperature was held for 4 hours to produce alcoholysis. The final hydroxyl value of the product was 6.6%.

(B) PREPARATION OF ISOCYANATED OILS (I)

| | G. |
|---|---|
| Above alcoholysis product | 2975 |
| Mineral spirits | 700 |
| Toluene diisocyanate (at NCO/OH ratio of 0.80) | 560 |

The toluene diisocyanate was added at 150° F. to a mineral spirits solution of the alcoholysis product; then the temperature was raised to 240° F. and held for 1.5 hours. More solvent was added as the viscosity increased. The final viscosity was $Z_6$ (Gardner-Holdt) at 65% solids in mineral spirits.

(II)

| | G. |
|---|---|
| Above alcoholysis mixture | 1000 |
| Mineral spirits | 300 |
| Toluene diisocyanate (at NCO/OH ratio of 0.60) | 200 |

The cooking procedure described in (I) was used. The final viscosity was $Z_6$ at 80% solids in mineral spirits.

Each of the isocyanated oils (I) and (II) was emulsified in the typical emulsion formulation given hereinabove, with satisfactory drying of the applied emulsion films and with good brush-wash properties. The oils can also be used in the typical emulsifiable primer formulation to give a solvent-type primer which can be applied as such after which any unused portion thereof can be emulsified by adding water to form an emulsion coating having good drying, brush-wash and protective qualities.

*Example 9*

An isocyanated-oil film-former is prepared from the following materials:

| | G. |
|---|---|
| Distilled monoglycerides of linseed oil (1.05 mols) | 373 |
| Mineral spirits | 363 |
| Toluene diisocyanate (1.00 mols) | 174 |

The monoglycerides and mineral spirts are mixed to a slurry in a flask equipped with a stirrer, thermometer and nitrogen gas inlet. The toluene diisocyanate can be added to the slurry at room temperature to temperatures as high as 180° F. After it has been added the batch temperature is slowly increased to a maximum of 315° F., with 280°–300° F. preferred. Usually 2–3 hours at about 300° F. will suffice to complete the reaction and reduce the free isocyanate content to zero. If necessary, calculated amounts of monoglyceride(s), diglyceride(s) or primary alcohols can be added to reduce the free isocyanate content to zero. Highly viscous polyurethanes result from the foregoing procedure, with viscosity decreasing as the NCO/OH ratio of the reactants is reduced. The resulting product can be reduced with a variety of solvents such as mineral spirits, toluene, xylene, ethylene glycol monoethyl ether acetate, etc. to obtain suitable viscosity and volatility properties appropriate for solvent-thinner emulsifiable primers and at any of such viscosities the solution can be used in the above typical emulsion formulation to produce emulsion primers having excellent drying and brush-wash properties.

*Example 10*

The following example illustrates the use of rosin in modifying isocyanated oil film-formers. Polyurethanes of drying oils can be rosin-modified in several ways, e.g.:
(1) By hot blending rosin or rosin ester(s) into an already-prepared isocyanated oil.
(2) Cooking rosin esters of polyols into a polyol-modified drying oil.
The second procedure is here illustrated.

(A) PREPARATION OF ROSIN DI-ESTER OF TRIMETHYLOLPROPANE

| | G. |
|---|---|
| Rosin (4.00 mols) | 1320 |
| Trimethylolpropane (2.00 mols) | 270 |
| Calcium oxide | 1 |

Esterification to an acid value of 17 is carried out by gaining 550° F. and holding for 2 hours.

(B) PREPARATION OF THE ROSIN ESTER MODIFIED LINSEED OIL

| | G. |
|---|---|
| Linseed oil (2.71 mols) | 2378 |
| Trimethylolpropane (1.50 mols) | 203 |
| Rosin ester product of part A | 570 |
| Calcium oxide | 1 |
| Mineral spirits | 100 |

The above materials are charged and alcoholyzed during 1.5 hours at 460° F.–480° F. The final acid value is 2.6 and the hydroxyl content is 2.6%, by wt.

(C) PREPARATION OF TWO ISOCYANATED OILS FROM THE REACTION PRODUCT OF PART B (1)

| | G. |
|---|---|
| Reation product of part B | 1590 |
| Mineral spirits | 300 |
| Toluene diisocyanate (at NCO/OH ratio of 0.70) | 158 |

The tolune diisocyanate is added over a fifteen minute period to the mineral spirits solution of the modified oil heated to 145° F. Then the temperature is raised to 250° F. and held for 1.5 hours. The final viscosity is H–I (Gardner-Holdt, 25° C.) at 85% solids.

(2)

| | G. |
|---|---|
| Reaction product of part B | 1590 |
| Mineral spirits | 300 |
| Toluene diisocyanate (at NCO/OH ratio of 0.90) | 203 |

The procedure described in part 1 hereof was used. The final viscosity of the polyurethane was P–Q at 85% solids.

When each of the polyurethanes of parts 1 and 2 above is emulsified in the typical emulsion formulation given hereinabove there is produced an emulsion primer having good drying and brush-wash properties. However, the emulsion stability is found to be somewhat poor for a commercial product. The polyurethanes of parts 1 and 2 can also be thinned with solvents, blended with our indicated emulsifiers, and pigmented to form solvent-thinned, emulsifiable (but unemulsified) primers, e.g. formulated in accordance with the typical emulsifiable formulation, supra.

*Example 11*

The coating composition of Example 2 was modified by adding linseed oil thereto in the ratio of 1 part by weight of linseed to 2 parts of the whole composition. The oil was readily emulsified by stirring it into the coating emulsion. Tests of the blended emulsion mixture revealed that the blend had improved brush-wash properties but dried more slowly than the linseed oil free emulsion. The product can be used equally well in the typical emulsifiable formulation, supra.

When the linseed oil was replaced with tung oil in a similar test, it was found that the resulting blended emulsion had good drying and brush-wash properties. Good results were secured also in a product formulated in accordance with the typical emulsifiable formulation.

*Example 12*

Due to its tendency to produce highly viscous or gelled materials tung oil can not readily be alcoholyzed to produce partial esters for use in the present invention. However, it can be blended in various amounts with other drying oils (e.g. with linseed oil up to 50% by weight; with soya oil the limit would be about 60%), and then alcoholyzed successfully.

The use of lower alkanol esters of tung, such as methyl ester of tung oil, permits the preparation by inter-esterification of mono- and di-esters of various polyols, which can be subsequently reacted with the diisocyanates in the manners described hereinabove.

Two moles (588 grams) of a commercial methyl ester of tung oil acids is interesterified with one mole (135 grams) of trimethylol propane in the presence of 0.2 g. lime as catalyst and 50 g. xylene as solvent. Solvent and alcohol are stripped off after 8 hours of reflux at 390–400° F. The batch is cooled to 150° F. and toluene diisocyanate (0.45 mole, 78 g.) is added slowly (20 minutes). The temperature is raised to 220° F. and held one hour. The viscosity is $Z_5$ (Gardner Holdt 25° C.).

The product, when tested in the typical emulsion formulation supra, had satisfactory brush-wash and drying properties. When tested in the typical emulsifiable formulation, the resulting primer had good film-forming and drying properties and could be readily emulsified to form a stable emulsion.

*Example 13*

Two moles (1758 grams) linseed oil, 2 moles (194 grams) glycerine, and ⅓ mole (241 grams) Niax LHT 240 [2] were alcoholyzed during 2½ hours at 450–460° F. in the presence of 0.5 g. lime as catalyst and 50 grams mineral spirits as solvent. During cooking 500 grams water-free mineral spirits was added. At 140° F. 3 moles (522 grams) toluene diisocyanate was added during ½ hour. The viscosity of the product was $Z_6$ after 1 hour at 250° F. The brush-wash was excellent but dry was only fair in the form of an emulsion corresponding to the typical formula supra. The product performs well in the typical emulsifiable formulations.

In reference to alkyd resins modified with isocyanates to yield our "isocyanated oils," it will be recognized that the hydroxyl groups available in alkyds and oil-modified-alkyds such as are made by reacting glyceride oils or other polyol esters with dicarboxylic acids such as phthalic acid or anhydride, isophthalic acid or anhydride, maleic acid or anhydride, etc. can be reacted with toluene diisocyanate or other diisocyanates to produce polyurethane-modified alkyds of higher viscosity, lower moisture sensitivity, better gloss retention and improved "hold-out" (i.e., non-sinking qualities in a wet film applied to a porous substrate). The longer oil alkyds are especially suitable for such purposes and are easy to handle because of their reduced tendencies to react to gelled products. However short oil alkyds can also be used provided the —NCO/OH ratio is reduced to moderately low values. The hydroxyl value of the alkyd should be determined first followed by a series of graduated experiments to determine the optimum —NCO/OH ratio producing the desired drying, resistance, durability or other properties.

*Example 14*

Half the hydroxyl content of 1338 grams of a linseed oil/pentaerythritol alcoholysis product having an hydroxyl value of 2.85% by wt. (2.24 equiv. wts. OH) is esterified with 93 grams (1.12 equiv. wts.) of isophthalic acid, to an acid value of 4.7. Reaction is carried out at 450° F. (one hour) in the presence of 50 grams xylene. The batch is cooled to 150° F. before adding 97 grams of toluene diisocyanate. In 1.5 hours the temperature is raised to 275° F. and held about one hour to gain a free isocyanate content of zero. The viscosity then is U–V (Gardner-Holdt, 25° C.).

When the resulting polyurethane alkyd is emulsified in the typical formula, supra, there is secured an emulsion primer having good drying and brush-wash qualities. The corresponding non-urethane alkyd made by esterifying all of the hydroxyls with isophthalic acid to a product having a viscosity of P–Q and acid value of 4 could not be stably emulsified in the typical emulsion formulation. A total cooking time of 10 hours was required to reach the said acid value. Good results are secured when the product is used in the typical emulsifiable formulation.

The next three examples illustrate the preparation and use of adducts of polyol/fatty acid esters. It will be appreciated that the properties of such esters can be modified greatly by converting them to Diels-Alder type diene adducts.

*Example 15*

The alcoholysis of 1172 grams (1.33 mols) of alkali-refined linseed oil and 68 grams (0.70 mol) of glycerine to diglyceride was accomplished by heating one-half hour at 450° F. with 0.20 gram calcium oxide as catalyst. The apparatus was the usual three-necked flask equipped with stirrer, thermometer and nitrogen gas inlet. When the alcoholysis mixture had cooled to 300° F., a solution of 140 grams (1.06 mols) dicyclopentadiene and 1.40 grams of di-tertiary butyl peroxide as catalyst were added slowly (over a period of 45 minutes). The temperature was slowly raised (in about 6 hours) to 470° F. and held for one hour. Then the unreacted pentadiene amounting to 6 mls. was stripped off. The stripped adduct was cooled to 160° F. at which temperature the addition of 174 grams of toluene diisocyanate (1 mol) was started. All had been added during the next thirty minutes. Then the temperature was increased to 300° F. and held for 3 hours. Tests then showed no free isocyanate to remain. The viscosity was $Z_2$–$Z_3$ (Gardner Holdt) at 100% solids.

The resulting product was emulsified in the typical emulsion formula supra and was found to yield an emulsion primer having good drying qualities. The emulsion stability, however, was somewhat inferior compared to commercial standards. Good results were also secured from its use in the emulsifiable formulation, supra.

*Example 16*

3516 grams (4.00 mols) alkali-refined linseed oil was styrenated with 624 grams (6.00 mols) styrene containing 6.24 grams di-tertiary butyl peroxide. Addition was carried out at 325° F. with gradual increase of temperature to 400° F. During the 16 hour cooking period the viscosity increased to B+ (Gardner-Holdt).

One-half of the above product was alcoholyzed with pentaerythritol and 0.4 gram calcium oxide, during one hour at 460° F. The resulting partial ester was cooled to 160° F., at which time there was added 272 grams (1.56 mols) of toluene diisocyanate. After 1.5 hours at 250° F. the batch contained no free isocyanate and the viscosity was $Z_2$ (Gardner Holdt 25° C.). The resulting product was tested in the typical emulsion formula, supra, and was satisfactory in all respects, e.g. in drying, brush-washing, film-forming and other coating qualities. The product performed very well in the typical emulsifiable formulation.

*Example 17*

Adducts with maleic anhydride can be prepared in various known ways, such as by addition of maleic anhydride or maleic alkyl esters to a drying oil. The present example illustrates an alternative procedure wherein maleic

---

[2] Niax LHT 240 is a commercial product, and is described in the Carbide and Carbon Company Bulletin F-40378 of July 1958 at pg. 1 as being a hexane triol/propylene oxide adduct having a molecular weight of 700 and an hydroxyl number of 240.

anhydride or maleic esters are added to the polyurethane of drying oil esters (i.e. to already-isocyanated oils).

To 750 grams of the reaction product of toluene diisocyanate and superglycerinated linseed oil (40% monoglycerides) dissolved in mineral spirits was added 75 grams maleic anhydride. The mixture was heated at 340°–350° F. for 1.5 hours to an acid value of 37 (based on solids) and a Gardner Holdt viscosity of U-V (25° C.) at 80% solids. The following table illustrates how acid value and viscosity can be varied when desired at a maleic anhydride content of 10%.

| Acid Value | Viscosity (Gardner Holdt) | Cooking Time at 350° F. (hours) |
|---|---|---|
| 28 | X-Y at 55% solids | 4 |
| 37 | U-V at 80% solids | 1.5 |
| 44 | T at 79% solids | .75 |

The resulting products, when tested in the typical emulsion formula supra, have useful drying, brush-wash and protective qualities. The products perform well in the typical emulsifiable formulation.

*Example 18*

It will be appreciated that a wide variety of partial tall oil esters of polyols can be used for the preparation of polyurethanes of the types contemplated within the scope of our herein coined term of "isocyanated oils." This example illustrates the preparation of a tall oil/pentaerythritol/glycerol ester subsequently isocyanated with toluene diisocyanate.

| | Grams |
|---|---|
| Tall oil (1.55 mols) | 450 |
| Pentaerythritol (0.52 mols) | 72 |
| Glycerine (0.52 mols) | 50 |
| Xylene | 100 |
| Toluene diisocyanate (2.00 mols) | 174 |

The first four materials are charged to a 3-necked flask equipped with agitator, thermometer and nitrogen gas inlet, and therein heated to reflux. Esterification to an acid value of 25 is secured 2.5 hours after reflux starts. Then the xylene is stripped off to attain a final temperature of 480° F. The ester mass is then reduced with 600 grams mineral spirits and cooled to 145° F. at which temperature the diisocyanate is added over a ten minute period. The temperature is raised slowly (in a 2 hour period) to 300° F. and held there for four hours before the product becomes free of isocyanates as shown by infra-red tests. The viscosity is C at 50% solids in mineral spirits. Lower ratios of —CNO to OH content will reduce the time required to eliminate free isocyanate groups as well as yielding polyurethanes having lower viscosities. The product performs well in both the typical emulsion and emulsifiable formulations.

Unsaturated drying or semi-drying type glyceride oils which have been bodied by heat (with or without the assistance of a heat-bodying catalyst) or by blowing can be converted to polyurethanes of the present invention useful for emulsifiable and/or emulsion coatings. Conversion of the bodied oils to partial esters can be effected by alcoholysis or otherwise in the ways described hereinabove and then reacted with polyisocyanates in the manners also explained hereinabove. The amount of isocyanate compound(s) that can be utilized for such purposes is generally smaller than with partial esters of unbodied oils because of the higher complexity produced in the oils and their resulting partial esters by the bodying treatment(s). The blown bodied oils can be reacted directly with the isocyanate(s) to the extent of their hydroxyl contents, but it is generally preferable to raise the hydroxyl content by alcoholysis or other treatments bringing about the formation of partial esters. In all cases, however, it should be recognized that the bodied oils are apt to be at least soft gels so that care is needed in proportioning the isocyanates so as not to gel the reaction mass. The following example illustrates the use of bodied oils in accordance with the present invention.

*Example 19*

To 3.33 mols (2930 grams) of light bodied linseed oil and 1.38 mols (187 grams) of trimethylolpropane in the usual 3-necked flask, 0.7 gram calcium oxide is added as alcoholysis catalyst. The batch is held at 470° F. for one hour, then cooled to 150° F. Toluene diisocyanate in an amount of 480 grams (2.76 mols) is added in a thirty minute period. As the viscosity increased, 300 grams of toluene was added. After 3.5 hours at 250° F. infra-red tests show that no free isocyanate remains. The viscosity then at 92% solids is $Z_6$ (Gardner Holdt 25° C.). When the polyurethane is emulsified in the typical emulsion formula supra there is produced an emulsion primer having useful drying and protective qualities. The product is also fully satisfactory when used in the typical emulsifiable formulation.

Having described our invention, what we claim is:

1. A pigmented emulsifiable coating composition which is particularly adapted for use as a primer on bare and coated wood, said composition being thinnable with an aqueous phase to form a stable alkaline emulsion having a continuous aqueous phase and having a discontinuous, dispersed film-forming phase, said composition being composed essentially of (A) a film-forming component in which the principal film-forming material is a water-insoluble urethane which is substantially free of unreacted —NCO groups and is the reaction product of (a) partial carboxylic acid esters of polyhydric alcohols, said partial esters having unesterified hydroxyl groups of said alcohols available for subsequent reaction with —NCO groups of polyisocyanates, and (b) polyisocyanate compounds having an average of about two —NCO groups per molecule and proportioned in respect to said partial esters so as to provide from about .50 to 1 —NCO group per esterifiable hydroxyl group in said partial esters, (B) finely-divided inorganic solid material selected from the group consisting of pigments and mixtures of pigments with up to 50% by weight of fillers, extenders and mixtures of the latter, said finely-divided material being present in amounts yielding a pigment volume concentration between about 20% to 50%; (C) 0.5%–2.0% by weight based on the film-forming solids of said film-forming component, of oil-soluble polyvalent metal salt type driers; and (D) an emulsifier component having an HLB value between about 11 and 15 and consisting essentially of surfactants selected from the class consisting of isopropyl amine dodecyl benzene sulfonate, and mixtures thereof with sodium lauryl sulfate, said emulsifier component being dispersed in said coating composition in amounts of about 5–18% by weight sufficient to emulsify and disperse said film-forming phase in said aqueous phase when the latter constitutes between about 12.5% and 50% of the total weight of said coating composition, the carboxylic acids of said partial esters in (a) above being selected from the group consisting of (1) dicarboxylic acids and mixtures of carboxylic acids having an average of two carboxyls per molecule, (2) ethylenically-unsaturated monocarboxylic acids and their mixtures with saturated monocarboxylic acids, having an iodine value of at least 90 and corresponding to the acids contained in triglyceride oils selected from the class consisting of drying, semi-drying and non-drying triglyceride oils, their carbon-carbon adducts, and mixtures of the foregoing with minor amounts of sulfonated triglyceride oils, (3) ethylenically-unsaturated acids and their mixtures with saturated acids, having an iodine value of at least 120 and corresponding to the acids contained in heat-bodied drying and semi-drying triglyceride oils, (4) mixtures of the acids in (2) and (3) with rosin acids and (5) mixtures of the acids in (2) and (3) with the tall oil acids.

2. An emulsifiable coating composition as claimed in claim 1 wherein said finely-divided material of (B) contains litharge in an amount corresponding to at least 1.6% by weight of the total weight of said coating composition, and wherein the salt-type driers are selected from the group consisting of lead, manganese and calcium salts of hydrocarbyl carboxylic acids.

3. An emulsifiable coating composition as claimed in claim 2 wherein said finely divided material of (B) additionally contains basic carbonate white lead in an amount corresponding to from 8% to 21% of the total volume of said finely divided material.

4. An emulsifiable coating composition as claimed in claim 2 wherein the film-forming material is the reaction product of partial polyhydric alcohol esters of ethylenically-unsaturated monocarboxylic acids and their mixtures with saturated monocarboxylic acids, having an iodine value of at least 90 and corresponding to the acids contained in triglyceride oils selected from the class consisting of drying, semi-drying and non-drying triglyceride oils, their carbon-carbon adducts, and mixtures of the foregoing with minor amounts of sulfonated triglyceride oils, and wherein said polyisocyanates are used in amounts giving an —NCO/OH ratio of .75–1.0.

5. An emulsifiable coating composition as claimed in claim 4, wherein said polyisocyanates are diisocyanates.

6. An emulsifiable composition as claimed in claim 5 wherein the diisocyanate is toluene diisocyanate.

7. An emulsifiable coating composition as claimed in claim 3 wherein the film-forming material is the reaction product of partial polyhydric alcohol esters of ethylenically-unsaturated monocarboxylic acids and their mixtures with saturated monocarboxylic acids, having an iodine value of at least 90 and corresponding to the acids contained in triglyceride oils selected from the class consisting of drying, semi-drying and non-drying triglyceride oils, their carbon-carbon adducts, and mixtures of the foregoing with minor amounts of sulfonated triglyceride oils, and wherein said polyisocyanates are used in amounts giving an —NCO/OH ratio of .75–1.0.

8. An emulsifiable coating composition as claimed in claim 7, wherein said polyisocyanates are diisocyanates.

9. An emulsifiable coating composition as claimed in claim 8 wherein the diisocyanate is toluene diisocyanate.

10. An emulsion coating composition which is an alkaline emulsion having a continuous aqueous phase and a discontinuous, dispersed, film-forming phase, said emulsion being composed essentially of (A) a film-forming component in which the principal film-forming material is a water-insoluble urethane which is substantially free of unreacted —NCO groups and is the reaction product of (a) partial carboxylic acid esters of polyhydric alcohols, said partial esters having unesterified hydroxyl groups of said alcohols available for subsequent reaction with —NCO groups of polyisocyanates, and (b) polyisocyanate compounds having an average of about two —NCO groups per molecule and proportioned in respect to said partial esters so as to provide from about .50 to 1 —NCO group per esterifiable hydroxyl group in said partial esters, (B) an inorganic solid matter component composed of finely-divided inorganic solid material selected from the group consisting of pigments and mixtures of pigments with up to 50% by weight of fillers, extenders and mixtures thereof, said finely-divided material being present in amounts yielding a pigment volume concentration between about 20% to 50%; (C) 0.5–2.0% by weight, based on the film-forming solids of said film-forming component, of oil-soluble polyvalent metal salt-type driers; said coating composition additionally including an emulsifier component having an HLB value between about 11 and 15 and consisting essentially of surfactants selected from the class consisting of isopropyl amine dodecyl benzene sulfonate, and mixtures thereof with sodium lauryl sulfate, said emulsifier component being dispersed in said coating composition in amounts of about 5–18% by weight sufficient to emulsify and disperse said film-forming phase in said aqueous phase when the latter constitutes between about 12.5% and 50% of the total weight of said coating composition, the carboxylic acids of said partial esters in (a) above being selected from the group consisting of (1) dicarboxylic acids and mixtures of polycarboxylic acids having an average of two carboxyls per molecule, (2) ethylenically-unsaturated monocarboxylic acids and their mixtures with saturated monocarboxylic acids, having an iodine value of at least 90 and corresponding to the acids contained in triglyceride oils selected from the class consisting of drying, semi-drying and non-drying triglyceride oils, their carbon-carbon adducts, and mixtures of the foregoing with minor amounts of sulfonated triglyceride oils, (3) ethylenically-unsaturated acids and their mixtures with saturated acids, having an iodine value of at least 120 and corresponding to the acids contained in heat-bodied drying and semi-drying triglyceride oils, (4) mixtures of the acids in (2) and (3) with rosin acids and (5) mixtures of the acids in (2) and (3) with tall oil acids.

11. An emulsion coating composition as claimed in claim 10 wherein the film-forming material is the reaction product of partial polyhydric alcohol esters of ethylenically-unsaturated monocarboxylic acids and their mixtures with saturated monocarboxylic acids, having an iodine value of at least 90 and corresponding to the acids contained in triglyceride oils selected from the class consisting of drying, semi-drying and non-drying triglyceride oils, their carbon-carbon adducts, and mixtures of the foregoing with minor amounts of sulfonated triglyceride oils, and wherein said polyisocyanates are used in amounts giving an —NCO/OH ratio of .75–1.0.

12. A coating composition as claimed in claim 11 wherein said polyisocyanates are diisocyanates, and wherein the polyvalent metal salt-type driers are selected from the group consisting of lead, manganese and calcium salts of hydrocarbyl carboxylic acids.

13. An emulsion coating composition prepared from the composition claimed in claim 1 by adding water thereto to provide 12.5–50% of water, by weight, based on the total weight of the whole composition.

14. An emulsion coating composition prepared from the composition claimed in claim 2 by adding water thereto to provide 12.5–50% of water, by weight, based on the total weight of the whole composition.

15. An emulsion coating composition prepared from the composition claimed in claim 4 by adding water thereto to provide 12.5–50% of water, by weight, based on the total weight of the whole composition.

16. An emulsion coating composition prepared from the composition claimed in claim 7 by adding water thereto to provide 12.5–50% of water, by weight, based on the total weight of the whole composition.

17. An emulsion coating composition prepared from the composition claimed in claim 8 by adding water thereto to provide 12.5–50% of water, by weight, based on the total weight of the whole composition.

18. An emulsion coating composition prepared from the composition claimed in claim 9 by adding water thereto to provide 25–40% of water, by weight, based on the weight of the whole composition.

References Cited by the Examiner

UNITED STATES PATENTS

| | | | |
|---|---|---|---|
| 2,625,532 | 1/53 | Seeger | 260—75 |
| 2,897,166 | 7/59 | Eitel et al. | 260—18 |
| 2,905,649 | 9/59 | Craig et al. | 260—825 |
| 2,943,947 | 7/60 | Szukiewicz | 260—18 |
| 2,968,575 | 1/61 | Mallonee | 106—287 |
| 3,022,327 | 2/62 | Waythomas | 260—18 |

LEON J. BERCOVITZ, *Primary Examiner.*

ALPHONSO D. SULLIVAN, MILTON S. STERMAN,
*Examiners.*

UNITED STATES PATENT OFFICE
CERTIFICATE OF CORRECTION

Patent No. 3,210,302

October 5, 1965

Stephen T. Bowell et al.

It is hereby certified that error appears in the above numbered patent requiring correction and that the said Letters Patent should read as corrected below.

Column 3, line 3, for "2,258,475" read -- 2,358,475 --; column 4, line 8, for "of" read -- or --; column 10, line 40, for "tolune" read -- toluene --.

Signed and sealed this 19th day of July 1966.

(SEAL)
Attest:

ERNEST W. SWIDER
Attesting Officer

EDWARD J. BRENNER
Commissioner of Patents